(12) United States Patent
Liu et al.

(10) Patent No.: US 8,660,225 B2
(45) Date of Patent: Feb. 25, 2014

(54) METHOD AND DEVICE FOR ACQUIRING PRECODING MATRIX

(71) Applicant: Huawei Technologies Co., Ltd., Guangdong (CN)

(72) Inventors: Sheng Liu, Shenzhen (CN); Yinggang Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/873,940

(22) Filed: Apr. 30, 2013

(65) Prior Publication Data

US 2013/0235960 A1  Sep. 12, 2013

Related U.S. Application Data

(63) Continuation of application No. 13/671,121, filed on Nov. 7, 2012, now abandoned, which is a continuation of application No. PCT/CN2011/073733, filed on May 6, 2011.

(30) Foreign Application Priority Data

May 7, 2010 (CN) .......................... 2010 1 0168681

(51) Int. Cl.
    *H04B 1/10* (2006.01)
(52) U.S. Cl.
    USPC ............................ 375/346; 375/260; 375/349
(58) Field of Classification Search
    USPC .......... 375/316, 219–220, 260, 285, 346–349
    See application file for complete search history.

(56) References Cited

U.S. PATENT DOCUMENTS

| 2005/0190868 A1 | 9/2005 | Khandekar et al. |
| 2006/0153283 A1 | 7/2006 | Scharf et al. |

(Continued)

FOREIGN PATENT DOCUMENTS

| CN | 101272364 A | 9/2008 |
| CN | 101394254 A | 3/2009 |

(Continued)

OTHER PUBLICATIONS

International Search Report in corresponding International Patent Application No. PCT/CN2011/073733 (Aug. 18, 2011). Written Opinion of the International Searching Authority in corre-sponding International Patent Application No. PCT/CN2011/073733 (Aug. 18, 2011).
Gomadam et al., "Approaching the Capacity of Wireless Networks Through Distributed Interference Alignment," IEEE GLOBECOM Proceedings, 2008, IEEE, Washington, DC.

(Continued)

*Primary Examiner* — Sam K Ahn
*Assistant Examiner* — Janice Tieu
(74) *Attorney, Agent, or Firm* — Leydig, Voit & Mayer, Ltd.

(57) ABSTRACT

A method and device for acquiring a precoding matrix are provided by the present invention. The method for acquiring a precoding matrix includes: for each receiving end, selecting the interference vectors as the interference space basis vectors from whole interference vectors, representing the remaining interference vectors as the linear combination of the interference space basis vectors, wherein the remaining interference vectors are the interference vectors in the whole interference vectors of the receiving end except the interference vectors which act as the interference space basis vectors (101); determining the currently used precoding matrix according to the linear combination of the interference space basis vectors represented by the remaining interference vectors of each receiving end and the current channel condition (102). The technical solution of the present invention can eliminate interference and do not generate Bit Error Rate (BER) floor.

8 Claims, 4 Drawing Sheets

(56) References Cited

U.S. PATENT DOCUMENTS

| | | |
|---|---|---|
| 2010/0054358 A1 | 3/2010 | Ko et al. |
| 2010/0329371 A1* | 12/2010 | Zhou et al. ................... 375/260 |
| 2012/0128083 A1 | 5/2012 | Ren |

FOREIGN PATENT DOCUMENTS

| | | |
|---|---|---|
| CN | 101483460 A | 7/2009 |
| CN | 101626262 A | 1/2010 |
| CN | 101682909 A | 3/2010 |
| EP | 1404047 A2 | 3/2004 |
| EP | 2141824 A1 | 1/2010 |
| EP | 2182663 A1 | 5/2010 |
| JP | 2007215043 A | 8/2007 |
| JP | 2007215045 A | 8/2007 |
| WO | 2010024582 A2 | 3/2010 |
| WO | WO2010024582 A2 | 3/2010 |

OTHER PUBLICATIONS

Xiao et al., "Downlink Linear Max-MSE Transceiver Design for Multiuser MIMO Systems Via Dual Decomposition," 2008, IEEE, Washington, DC.

Cadambe et al., "Interference Alignment and Degrees of Freedom of the K-User Interference Channel," IEEE Transaction on Information Theory, Aug. 2008, vol. 54, No. 8, IEEE, Washington, DC.

Peters et al., "Interference Alignment Via Alternating Minimization," 2009, IEEE, Washington, DC.

Zhang et al., "Joint Linear Transmitter and Receiver Design for the Downlink of Multiuser MIMO Systems," IEEE Communications Letters, Nov. 2005, vol. 9, No. 11, IEEE, Washington, DC.

1st Office Action in corresponding Chinese Patent Application No. 201010168681.4 (Dec. 25, 2012).

Chinese Search Report in corresponding Chinese Patent Application No. 201010168681.4 (Dec. 16, 2012).

Extended European Search Report in corresponding European Patent Application No. 11777174.1 (Aug. 16, 2013).

\* cited by examiner

```
┌─────────────────────────────────────────────────┐
│ For each receiving end, selecting interference  │
│ vectors as interference space basis vectors     │
│ from the whole interference vectors, and        │
│ representing remaining interference vectors as  │──── 101
│ a linear combination of the interference space  │
│ basis vectors, wherein the remaining            │
│ interference vectors are the interference       │
│ vectors in the whole interference vectors of    │
│ the receiving end except the interference       │
│ vectors which act as the interference space     │
│ basis vectors                                   │
└─────────────────────────────────────────────────┘
                        │
                        ▼
┌─────────────────────────────────────────────────┐
│ Determining a currently used precoding matrix   │──── 102
│ according to the linear combination of the      │
│ interference space basis vectors represented    │
│ by the remaining interference vectors of each   │
│ receiving end and the current channel condition │
└─────────────────────────────────────────────────┘
```

Fig. 1

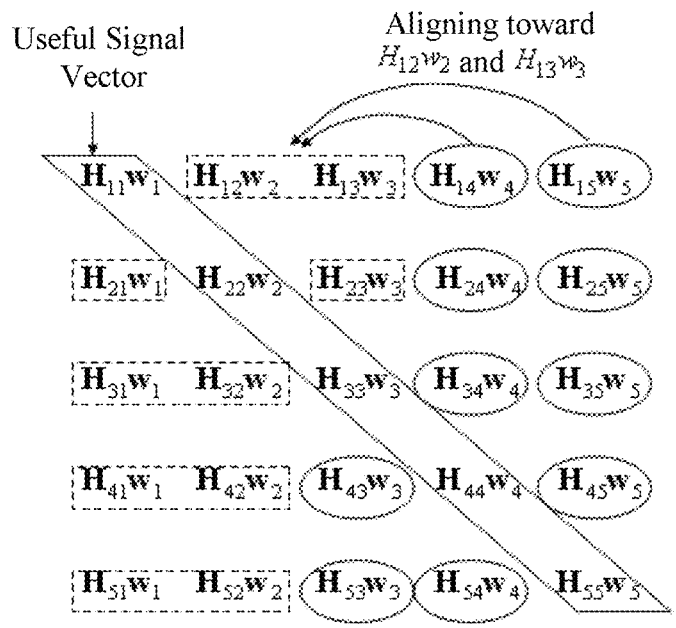

Fig. 2

METHOD AND DEVICE FOR ACQUIRING PRECODING MATRIX

CROSS-REFERENCE TO RELATED APPLICATIONS

This application is a continuation of U.S. patent application Ser. No. 13/671,121, filed on Nov. 7, 2012, which is a continuation of International Patent Application No. PCT/CN2011/073733, filed on May 6, 2011, which claims priority to Chinese Patent Application No. 201010168681.4, filed on May 7, 2010. The above-mentioned patent applications are hereby incorporated by reference in their entireties.

FIELD OF TECHNOLOGY

The present invention relates to the field of communication technology, and particularly, to a method for acquiring a precoding matrix and a device therefore.

BACKGROUND OF THE INVENTION

The Multi Input Multi Output (MIMO) technology is a significant breakthrough of the smart antenna technology in the field of wireless mobile communication. The MIMO technology can improve the communication system capacity and the spectrum efficiency exponentially without increasing the bandwidth, and it is the key technology applied to the new generation of mobile communication system. Both the transmitting end and the receiving end of the MIMO system are provided with a plurality of antennas. During the signal transmission, the transmitting end may transmit a plurality of independent signals through different transmitting antennas in a Spatial Multiplexing (SM) mode, while the receiving end may receive signals from different receiving antennas and acquire signals transmitted by the transmitting end from the received signals.

In the prior art, the transmitting ends only share their respective channel information. Then each transmitting end centralizes interferences from all other transmitting ends to the signal spaces that can be processed by corresponding receiving ends in an Interference Alignment (IA) method based on a principle of maximizing the Signal-to-Interference and Noise Ratio (SINR) at the receiving end and a principle of maximizing the Signal-to-Leakage and Noise Ratio (SLNR) at the transmitting end.

The prior art has the following deficiency:

In the prior art, each transmitting end centralizes the interferences from all other transmitting ends to the signal spaces that can be processed by corresponding receiving ends based on the principles of SINR and SLNR maximization, and can not completely eliminating interferences. As a result, when the Signal to Noise Ratio (SNR) is lowered to a certain degree such as 40 dB or 50 dB, the Bit Error Rate (BER) is no longer reduced along with the decrease of the SNR, and a BER floor occurs.

SUMMARY OF THE INVENTION

The embodiments of the present invention provide a method for acquiring a precoding matrix and a device therefore, which are capable of eliminating signal interferences and avoiding the BER floor.

For this purpose, the embodiments of the present invention provide:

A method for acquiring a precoding matrix, comprising:

for each receiving end, selecting interference vectors as interference space basis vectors from whole interference vectors, and representing remaining interference vectors as a linear combination of the interference space basis vectors, wherein the remaining interference vectors are the interference vectors in the whole interference vectors of the receiving end except the interference vectors which act as the interference space basis vectors; and determining a currently used precoding matrix according to the linear combination of the interference space basis vectors represented by the remaining interference vectors of each receiving end and the current channel condition.

A device for acquiring a precoding matrix, comprising:

an acquisition unit configured to select, for each receiving end, interference vectors as interference space basis vectors from whole interference vectors;

a linear combination unit configured to represent remaining interference vectors as a linear combination of the interference space basis vectors, wherein the remaining interference vectors are the interference vectors in the whole interference vectors of the receiving end except the interference vectors which act as the interference space basis vectors; and a calculation unit configured to determine a currently used precoding matrix according to the linear combination of the interference space basis vectors represented by the remaining interference vectors of each receiving end and the current channel condition.

In the embodiments of the present invention, for each receiving end, the interference vectors to be aligned are all represented as a linear combination of the interference space basis vectors, thus the interferences can be completely aligned and eliminated, without a BER floor occurring.

BRIEF DESCRIPTION OF THE DRAWINGS

In order to more clearly describe the technical solutions of the embodiments of the present invention or the prior art, the drawings to be used in the descriptions of the embodiments or the prior art are briefly introduced as follows. Obviously, the following drawings just illustrate some embodiments of the present invention, and a person skilled in the art can obtain other drawings from these drawings without paying a creative effort.

FIG. 1 is a flowchart of a method for acquiring a precoding matrix provided by an embodiment of the present invention;

FIG. 2 is a schematic diagram of an Interference Alignment (IA) provided by an embodiment of the present invention;

DETAILED DESCRIPTION OF THE INVENTION

Figure 3:
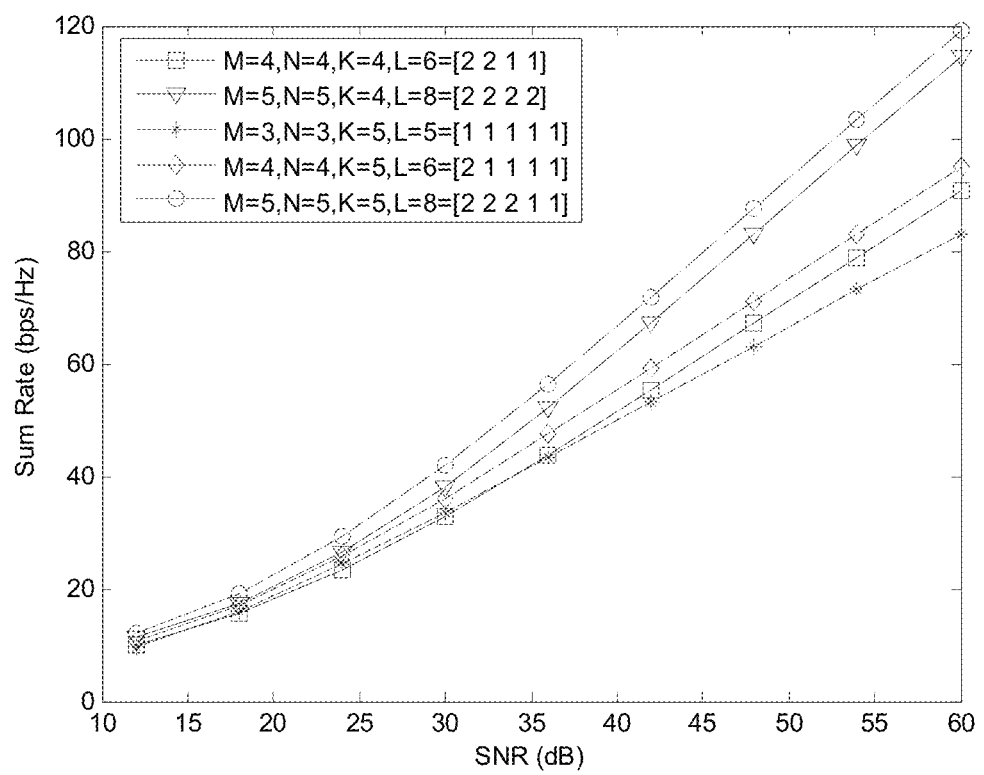
FIG. 3 is a simulation diagram of an IA scheme provided by an embodiment of the present invention.

The technical solutions of the embodiments of the present invention will be clearly and completely described as follows with reference to the drawings. Apparently, the described embodiments are just a part of embodiments of the present invention rather than all the embodiments. Based on the embodiments of the present invention, any other embodiment obtained by a person skilled in the art without paying a creative effort will fall within the protection scope of the present invention.

Referring to FIG. 1, an embodiment of the present invention provides a method for acquiring a precoding matrix, including:

101: for each receiving end, selecting interference vectors as interference space basis vectors from whole interference vectors, and representing remaining interference vectors as a linear combination of the interference space basis vectors, wherein the remaining interference vectors are the interference vectors in the whole interference vectors of the receiving end except the interference vectors which act as the interference space basis vectors.

102: determining a currently used precoding matrix according to the linear combination of the interference space basis vectors represented by the remaining interference vectors of each receiving end and the current channel condition.

Wherein, the interference vector may be represented as a product of a channel vector and a precoding vector. In that case, for the kth receiving end, it is determined in step 101 that the number of the interference space basis vectors is $N-L_K$, and $N-L_K$ interference vectors are selected as the interference space basis vectors from $L-L_K$ interference vectors; N is the number of the receiving antennas of the kth receiving end, $L_K$ is the number of the signal flows of the kth receiving end, and L is the total number of the signal flows of a plurality of receiving ends. Specifically, since the number of the receiving antennas of the kth receiving end is N and the number of the signal flows of the kth receiving end is $L_K$, the kth receiving end has an $L_K$-dimensional signal space and $N-L_K$-dimensional interference space. Since the total number of the signal flows of the plurality of receiving ends is L and the number of the signal flows of the kth receiving end is $L_K$, the kth receiving end totally has $L-L_K$ interference vectors, from which $N-L_K$ interference vectors are selected as the interference space basis vectors, thus the number of the remaining interference vectors (i.e., the interference vectors to be aligned) is $(L-L_K)-(N-L_K)=L-N$.

In that case, the process of step 102 may specifically includes:

acquiring a matrix $$\begin{bmatrix} \overline{H}_1 \alpha_1 \\ \overline{H}_2 \alpha_2 \\ \vdots \\ \overline{H}_{(L-N)K} \alpha_{(L-N)K} \end{bmatrix} = 0$$

according to the linear combination of the interference space basis vectors represented by the remaining interference vectors of each receiving end, and acquiring a first Lagrange function in an optimization method according to the matrix and the current channel condition;

wherein $\alpha_n = \lfloor \alpha_{n,0} \; \alpha_{n,1} \; \alpha_{n,2} \ldots \alpha_{n,(N-L_k)} \rfloor$, $n=(k-1)(L-N)+n'$, $n'=1, 2, \ldots, L-N$, $\alpha_{n,0}=-1$, $\alpha_{n,1}, \alpha_{n,2}, \alpha_{n,3}$ and $\alpha_{n(N-LK)}$ are coefficients of the interference space basis vectors, respectively, when the n'th remaining interference vector of the kth receiving end in the nth vector equation represents the linear combination of the interference space basis vectors; and in $\overline{H}_n$, the first column is a remaining interference vector, while other columns are the interference space basis vectors;

acquiring that $Aw=0$ according to the linear combination of the interference space basis vectors represented by the remaining interference vectors of each receiving end; acquiring a second Lagrange function in an optimization method according to the fact that $Aw=0$ and the current channel condition; wherein, each submatrix $A_{nl}$ in A is $N \times M$ dimensional, $1 \le L$, L is the total number of the data flows; an $A_{nl}$ corresponding to a remaining interference vector in the nth equation is a product of $\alpha_{n,0}$ and a channel matrix in the remaining interference vector, while an $A_{nl}$ corresponding to an interference space basis vector in the nth equation is a product of a channel matrix in the interference space basis vector and a coefficient of the interference space basis vector;

acquiring a cross-correlation function between vector $a_n$ and precoding matrix w using the first and second Lagrange functions; wherein specific forms of the first and second Lagrange functions will be detailedly described in subsequent embodiments;

substituting a preset initial value of w or a preset initial value of vector $a_n$ into the cross-correlation function to acquire a current value of w or a current value of vector an, then substituting the current value of w or the current value of vector $a_n$ into the cross-correlation function until a preset condition is satisfied. The preset condition is that the difference between a value acquired by substituting the acquired current value of w or the acquired current value of vector $a_n$ into the first or second Lagrange function this time and a value acquired by the substitution last time reaches a first preset threshold, or that the number of iterations reaches a second threshold.

Or, the interference vector may be represented as a product of a channel vector and an equilibrium vector. In that case, for the kth receiving end, it is determined that the number of the interference space basis vectors is $M-L_K$, and $M-L_K$ interference vectors are selected as the interference space basis vectors from $L-L_K$ interference vectors; wherein, M is the number of transmitting antennas of a transmitting end pairing with the kth receiving end, $L_K$ is the number of the signal flows of the kth receiving end, and L is the total number of the signal flows of a plurality of receiving ends. Specifically, since the number of the transmitting antennas of the transmitting end pairing with the kth receiving end is M and the number of the signal flows of the kth receiving end is $L_K$, the transmitting end has an $L_K$-dimensional signal space and $M-L_K$-dimensional interference space. Since the total number of the signal flows of the plurality of receiving ends is L and the number of the signal flows of the kth receiving end is $L_K$, the transmitting end totally has $L-L_K$ interference vectors, from which $M-L_K$ interference vectors are selected as the interference space basis vectors, thus the number of the remaining interference vectors (i.e., the interference vectors to be aligned) is $(L-L_K)-(M-L_K)=L-M$.

In that case, the process of step 102 may specifically includes:

acquiring a matrix $$\begin{bmatrix} \overline{H}_1 \beta_1 \\ \overline{H}_2 \beta_2 \\ \vdots \\ \overline{H}_{(L-M)K} \beta_{(L-M)K} \end{bmatrix} = 0$$

according to the linear combination of the interference space basis vectors represented by the remaining interference vectors of each receiving end, and acquiring a third Lagrange function in an optimization method according to the matrix and the current channel condition;

wherein $\beta_n = \lfloor \beta_{n,0} \; \beta_{n,1} \; \beta_{n,2} \ldots \beta_{n,(M-L_k)} \rfloor$, $n=(k-1)(L-M)+n'$, $n'=1, 2, \ldots, L-N$, $\beta_{n,0}=-1$, $\beta_{n,1}, \beta_{n,2}, \beta_{n,3}$ and $\beta_{n(M-LK)}$ are coefficients of the interference space basis vectors, respectively, when the n'th remaining interference vector of the kth receiving end in the nth vector equation represents the linear combination of the interference space basis vectors; and in $\bar{H}_n$, the first column is a remaining interference vector, while other columns are the interference space basis vectors;

acquiring that BG=0 according to the linear combination of the interference space basis vectors represented by the remaining interference vectors of each receiving end; and acquiring a fourth Lagrange function in an optimization method according to the fact that BG=0 and the current channel condition; wherein, each submatrix $B_{nl}$ in B is M×N dimensional, l≤L, L is the total number of the data flows; a $B_{nl}$ corresponding to a remaining interference vector in the nth equation is a product of $\beta_{n,0}$ and a channel matrix in the remaining interference vector, while a $B_{nl}$ corresponding to an interference space basis vector in the nth equation is a product of a channel matrix in the interference space basis vector and a coefficient of the interference space basis vector; in which, G is an equilibrium matrix composed of equilibrium vectors;

acquiring a cross-correlation function between vector $\beta_n$ and the equilibrium matrix is acquired using the third and fourth Lagrange functions;

substituting a preset initial value of equilibrium matrix G or a preset initial value of vector $\beta_n$ into the cross-correlation function to acquire a current value of equilibrium matrix G or a current value of vector $\beta_n$, then substituting the current value of equilibrium matrix G or the current value of vector $\beta_n$ into the cross-correlation function until a preset convergence condition is satisfied. The preset convergence condition is that the difference between a value acquired by substituting the acquired current value of equilibrium matrix G or the acquired current value of vector $\beta_n$ into the third or fourth Lagrange function this time and a value acquired by the substitution last time reaches a third preset threshold, or that the number of iterations reaches a fourth threshold.

In which, the transmitting end in the embodiments of the present invention may be a base station, and the receiving end may be a User Equipment (UE).

In the embodiments of the present invention, for each receiving end, the interference vectors to be aligned are all represented as a linear combination of the interference space basis vectors, thus the interferences can be completely aligned and eliminated, without any BER floor occurring.

I. In order to describe the idea that in step 101, the interference vectors to be aligned shall be represented as a linear combination of the interference space basis vectors, the following example is given in which each UE only receives one signal flow.

The signal received by the kth receiving end may be represented as:

$$y_k = H_{kk}W_k x_k + \sum_{i=1, i \neq k}^{K} H_{ki}W_i x_i + n_k \quad (1)$$

in which, $H_{kk}W_k X_k$ is a received useful signal, $$\sum_{i=1, i \neq k}^{K} H_{ki}W_i x_i$$

is a received interference signal, and $n_k$ is a noise vector having a variance $\sigma^2$. Herein $H_{kk}$ represents a channel matrix from the kth Base Station (BS) to the kth UE, and $H_{ki}$ represents a channel matrix from the ith BS to the kth UE, with the dimensions of N×M;

$W_k$ is a precoding matrix of the kth BS, and $x_k$ is a signal transmitted by the kth BS; $W_i$ is a precoding matrix of the ith BS, and $x_i$ is a signal transmitted by the ith BS.

In which, in Formula (1):

$$W_i x_i = \sum_{m=1}^{L_i} w_{im} x_{im}$$

$L_i$ is the number of the precoding vectors of the ith UE, namely the number of the signal flows transmitted by the ith UE; all the UEs (assuming that the number of each type of UEs is K) totally have $$L = \sum_{m=1}^{K} L_i$$

signal flows, it is not hard to understand that the L precoding vectors shall be pairwise independent; $w_{im}$ is the mth precoding vector of the ith BS, with the dimensions of M×1; and $x_{im}$ represents a transmitted signal, which is a scalar quantity.

Firstly, the IA scheme provided by the present invention is explained in a case of $L_i=1$, i.e., each UE just has one flow, thus Formula (1) shall be converted to be:

$$y_k = H_{k1}w_1 x_1 + H_{k2}w_2 x_2 + \ldots + H_{kk}w_k x_k + \ldots + n_k$$

the transmitted signal estimated according to the received signal of the kth UE is:

$$\hat{x}_k = g_k^H y_k = g_k^H H_{kk} w_k x_k + (g_k^H H_{k1} w_1 x_1 + g_k^H H_{k2} w_2 x_2 + \ldots) + g_k^H n_k \quad (2)$$

In which, $g_k^H$ is a 1×N-dimensional equilibrium vector for weighting. When $\|g_k\|^2=1$, the selection of $g_k$ does not change the noise power, so there is an essential condition for acquiring the optimal estimation of $x_k$: for any i, k=1, 2, . . . , K:

$$g_k^H H_{ki} w_i = 0, i \neq k \quad (3)$$

$g_k^H H_{kk} w_k = c_k$, $c_k$ is a positive number;

in which, in order to ensure the maximization of the SINR, $c_k$ shall be maximized to achieve the optimal detection performance.

For the kth UE, when $w_i$ is determined, $a_i = H_{ki}w_i$ may be assumed so as to satisfy $g_k^H H_{ki} w_i = 0|_{i \neq k}$, i=1, 2, . . . , K, thus $g_k^H a_i = 0|_{i \neq k}$, wherein $a_i = (a_{i1}, a_{i2}, \ldots, a_{iN})^T$, and a linear equation system composed of K−1 equations can be acquired as follows:

$$\begin{cases} \alpha_{11} g_{k1}^* + \alpha_{12} g_{k2}^* + \ldots + \alpha_{1N} g_{kN}^* = 0 \\ \ldots \\ \alpha_{k-1,1} g_{k1}^* + \alpha_{k-1,2} g_{k2}^* + \ldots + \alpha_{k-1,N} g_{kN}^* = 0 \\ \alpha_{k+1,1} g_{k1}^* + \alpha_{k+1,2} g_{k2}^* + \ldots + \alpha_{k+1,N} g_{kN}^* = 0 \\ \ldots \\ \alpha_{K1} g_{k1}^* + \alpha_{K2} g_{k2}^* + \ldots + \alpha_{KN} g_{kN}^* = 0 \end{cases} \quad (4)$$

In order to ensure untrivial solutions of Formula (4), it is required that among the K−1 equations, the coefficient vectors of at least L−N interference zero-forcing equations are linear combination of the coefficient vectors of N−1 interference zero-forcing equations, which is the IA constraint condition. In which, the interference zero-forcing equations refer to equations with zeros on the right of the equal signs in Formula (4). In case one UE only receives one signal flow, $$H_{k,i_m}w_{i_m} = \sum_{n=1}^{N-1} \alpha_{kn}H_{k,i_n}w_{i_n} \qquad (5)$$

In which, k=1, 2, . . . , K, $i_n|_{n=1, 2, \ldots, N-1} \in S_{k1}$, $i_m|_{m=1, 2, \ldots, K-N} \in S_{k2}$, $\alpha_{kn}$ represents a combination coefficient, $S_{k1}$ represents a set of interference space basis vectors and the set includes N−1 elements, $S_{k2}$ represents a set of interference vectors to be aligned and the set includes K−N elements, and $S_{k1} \cup S_{k2} \cup \{k\} = \{1, 2, \ldots, K\}$.

For the convenience of description, the above scheme adopts a single flow as an example, i.e., each UE just receives only one path of signals, namely each UE has one signal flow. In case the kth UE has $L_K$ signal flows, the total number of the interference vectors is $L-L_K$ and the number of the interference space basis vectors is $N-L_K$ for the UE, thus $N-L_K$ interference vectors are selected as the interference space basis vectors from the whole interference vectors, and the remaining interference vectors are represented as the linear combination of the interference space basis vectors, wherein the remaining interference vectors are the interference vectors to be aligned and the number thereof is $(L-L_K)-(N-L_K)=L-N$. In which, N is the number of the receiving antennas of the kth UE, and L is the total number of the signal flows of all the UEs.

The following example is given to make the IA scheme provided by the embodiment of the present invention be clearer. FIG. 2 is a schematic diagram of an IA provided by an embodiment of the present invention. Assuming that M=6, N=3 and K=5, i.e., there are five BSs and five UEs, wherein each UE has three receiving antennas and just receives one signal flow. For each UE, since the number of the receiving antennas is 3, the received signal vector has three dimensions, wherein one dimension is occupied by the useful signal, and two dimensions are reserved. In order to realize the IA, any three of the four interference vectors shall be linearly correlated. For this purpose, two of the four interference vectors are arbitrarily selected as the interference space basis vectors, and the two remaining interference vectors (i.e., the interference vectors to be aligned) are represented as the linear combination of the interference space basis vectors.

Referring to FIG. 2, for the first UE as illustrated in the first row, $H_{14}w_4$ is an interference vector to be aligned, and $H_{14}w_4$ is a linear combination of $H_{12}w_2$ and $H_{13}w_{13}$, and may be represented as:

$$H_{14}w_4 = \alpha_{11}H_{12}w_2 + \alpha_{12}H_{13}w_3 \qquad (6)$$

Similarly, $H_{15}w_5$ is a second interference vector to be aligned, and $H_{15}w_5$ is a linear combination of $H_{12}w_2$ and $H_{13}w_3$, and may be represented as:

$$H_{15}w_5 = \alpha_{13}H_{12}w_2 + \alpha_{14}H_{13}w_3 \qquad (7)$$

For the first UE, the number of the aligned interference vectors is L−N=2, and the number of the remaining interference vectors is N−1=2. Similarly, for the second, third, fourth and fifth UEs, multiple equations like (6) and (7) can be acquired to form an equation system.

II. Next, the situation of each UE receiving a single signal flow is extended to a situation of each UE receiving multiple signal flows. Assuming that the number of the signal flows received by the kth UE is Lk (Lk≥1), thus the signal flows of the UE occupy an $L_k$-dimensional space (the $L_k$-dimensional space is called as signal space), and the interference vectors shall be compressed into remaining $N-L_k$-dimensional space (the $L_k$-dimensional space is called as interference space), i.e.,:

$$H_{ki}w_{im}, m=1, 2, \ldots, L_i, i=1, 2, \ldots, K, i \neq k$$

In other words, for the kth UE, $L-L_k$ interference vectors must be aligned into the $N-L_k$ dimensional interference space. Assuming that $\pi_k$ represents a set of $N-L_k$ vectors selected as the interference space basis vectors from $L-L_k$ interference vectors, and $\pi_k'$ represents a set of the remaining $(L-L_k)-(N-L_k)L-N$ interference vectors to be aligned. For example, if K=3, M=10, N=15, L=18 and L1=L2=L3=6, for each UE, the number of the interference vectors is $L-L_k=12$, and the interference space is $N-L_k=9$ dimensional, i.e., the number of the interference space basis vectors is 9, thus $\pi_k$ and $\pi_k'$ for each UE may be represented as:

$$\pi_1 = \{w_{24}, w_{25}, w_{26}, w_{31}, \ldots, w_{36}\}, \pi'_1 = \{w_{21}, w_{22}, w_{23}\}$$

$$\pi_2 = \{w_{14}, w_{15}, w_{16}, w_{31}, \ldots, w_{36}\}, \pi'_2 = \{w_{11}, w_{12}, w_{13}\}$$

$$\pi_3 = \{w_{14}, w_{15}, w_{16}, w_{21}, \ldots, w_{26}\}, \pi'_3 = \{w_{11}, w_{12}, w_{13}\}$$

in such a representation method, the IA may be represented as:

$$\{H_{kj}w_{jm}: w_{jm} \in \pi'_k\} \subset \text{span}[H_{ki}w_{im}: w_{im} \in \pi_k], \\ k=1, 2, \ldots, K \qquad (8)$$

Formula (8) indicates that the vectors in $\pi_k'$ are represented as a linear combination of the vectors in $\pi_k$, thus Formula (8) is equivalent to the following vector equation:

$$H_{kj}w_{jm'} = \sum_{w_{im} \in \pi_k} \alpha_{nr}H_{ki}w_{im} \qquad (9)$$

$$W_{jm'} \in \pi'_k, k = 1, 2, \ldots, K$$

In which, r=1, 2, . . . , $N-L_k$, n=(k−1)(L−N)+n', n'=1, 2, . . . , L−N, and $\alpha_{nr}$ represents a coefficient of the rth interference vector in the nth vector equation. Obviously, $\alpha_{nr}$ cannot always be zero in each equation. Particularly, if $L_k=N$, the kth receiving end has no interference space, and M×1 zero vectors shall be put into $\pi_k$.

III. The process of step 102 is specifically described as follows.

For the convenience of subsequent calculation of the precoding matrix, Formula (8) is converted to be:

$$\alpha_{n,0}H_{kj}w_{jm'} + \sum_{w_{im} \in \pi_k} \alpha_{nr}H_{ki}w_{im} = 0 \qquad (11)$$

Formula (11) is tenable to each $w_{jm} \in \pi'_k$, wherein k=1, 2, . . . , K, r=1, 2, . . . , $N-L_k$, n(k−1)(L−N)+n', n'=1, 2, . . . , L−N, and $\alpha_{n,0}=-1$, thus Formula (11) can be represented in the form of matrix:

$$\begin{bmatrix} \overline{H}_1 \alpha_1 \\ \overline{H}_2 \alpha_2 \\ \vdots \\ \overline{H}_{(L-N)K} \alpha_{(L-N)K} \end{bmatrix} = 0 \quad (12)$$

In which, $\alpha_n = [\alpha_{n,0} \; \alpha_{n,1} \; \alpha_{n,2} \ldots \alpha_{n,(N-L_k)}]$; $\overline{H}_n$ is an N×(N−$L_k$+1) matrix in which the first column is $H_{kj}w_{jm'}$, $w_{jm} \in \pi'_k$, and the others are N−$L_k$ interference vectors in $\pi_k$, i.e., $H_{ki}w_{im}, w_{im} \in \pi_k$.

Formula (11) may be further rearranged as, $$Aw = 0$$

In which, $w = [w_{11}^T \; w_{12}^T \ldots w_{1,L_1}^T \ldots w_{K1}^T \; w_{K2}^T \ldots w_{K,L_K}^T]^T$ is an LM×1 cascade precoding vector, wherein L1 is the number of the signal flows received by the first UE, and $L_K$ is the number of the signal flows received by the Kth UE; correspondingly, there are L precoding vectors, and A is an (L−N)NK×LM matrix:

$$A = \begin{bmatrix} A_{11} & A_{12} & \ldots & A_{1L} \\ A_{21} & A_{22} & \ldots & A_{2L} \\ \vdots & \vdots & \ddots & \vdots \\ A_{(L-N)K,1} & A_{(L-N)K,2} & \ldots & A_{(L-N)K,L} \end{bmatrix} \quad (13)$$

In which, each submatrix $A_{nl}$ is N×M dimensional, n=(k−1)(L−N)+n', n'=1, 2, . . . , L−N, l=1, 2, . . . , L and k=1, 2, . . . , K. Since each w corresponds to one data flow l, the $A_{nl}$ corresponding to a remaining interference vector in the nth equation is a product of $\alpha_{n,0}$ and a channel matrix in the remaining interference vector, while the $A_{nl}$ corresponding to an interference space basis vector in the nth equation is a product of a channel matrix in the interference space basis vector and a coefficient of the interference space basis vector. Specifically, corresponding $A_{nl}$ in the nth equation may be represented as $$A_{nl} = \begin{cases} \alpha_{n0} H_{kj} & l \to w_{jm'} \in \pi'_k \\ \alpha_{nr} H_{ki} & l \to w_{im} \in \pi_k \\ 0 & \text{others} \end{cases} \quad (14)$$

In which, $l \to w_{jm} \in \pi'_k$ indicates that in the nth equation, a vector corresponding to the lth data flow is a remaining interference vector, i.e., the vector corresponding to the lth data flow is $w_{jm} \in \pi'_k$; $l \to w_{im} \in \pi_k$ indicates that in the nth equation, a vector corresponding to the lth data flow is an interference space basis vector, i.e., the vector corresponding to the lth data flow is $w_{im} \in \pi_k$.

In order to clearly describe the deformation of Formula (11), an example is given as follows: assuming that K=4, L=6, and the flow distribution is [2 2 1 1], i.e., the first and second UEs each has two flows, the third and fourth UEs each has one flow, and the number of the transmitting antennas M and the number of receiving antennas N are 4, respectively. So L−N=2, and the IA equation is $$\begin{cases} \alpha_{10}H_{12}w_{21} + \alpha_{11}H_{13}w_3 + \alpha_{12}H_{14}w_4 = 0 \\ \alpha_{20}H_{12}w_{22} + \alpha_{31}H_{13}w_3 + \alpha_{22}H_{14}w_4 = 0 \\ \alpha_{30}H_{21}w_{11} + \alpha_{31}H_{23}w_3 + \alpha_{32}H_{24}w_4 = 0 \\ \alpha_{40}H_{21}w_{12} + \alpha_{41}H_{23}w_3 + \alpha_{42}H_{24}w_4 = 0 \\ \alpha_{50}H_{31}w_{11} + \alpha_{51}H_{32}w_{21} + \alpha_{52}H_{32}w_{22} + \alpha_{53}H_{34}w_4 = 0 \\ \alpha_{60}H_{31}w_{12} + \alpha_{61}H_{32}w_{21} + \alpha_{62}H_{32}w_{22} + \alpha_{63}H_{34}w_4 = 0 \\ \alpha_{70}H_{41}w_{11} + \alpha_{71}H_{42}w_{21} + \alpha_{72}H_{42}w_{22} + \alpha_{73}H_{43}w_3 = 0 \\ \alpha_{80}H_{41}w_{12} + \alpha_{81}H_{42}w_{21} + \alpha_{82}H_{42}w_{22} + \alpha_{83}H_{43}w_3 = 0 \end{cases}$$

Thus, $$\overline{H}_1 = [H_{12}w_{21} \; H_{13}w_3 \; H_{14}w_4], \ldots$$

$$\overline{H}_4 = [H_{21}w_{12} \; H_{23}w_3 \; H_{24}w_4],$$

$$\overline{H}_5 = [H_{31}w_{11} \; H_{32}w_{21} \; H_{32}w_{22}H_{34}w_4], \ldots$$

$$\overline{H}_8 = [H_{41}w_{12} \; H_{42}w_{21} \; H_{42}w_{22}H_{43}w_3],$$

$$\alpha_1 \begin{bmatrix} \alpha_{10} \\ \alpha_{11} \\ \alpha_{12} \end{bmatrix}, \ldots, \alpha_4 = \begin{bmatrix} \alpha_{40} \\ \alpha_{41} \\ \alpha_{42} \end{bmatrix}, \alpha_5 \begin{bmatrix} \alpha_{50} \\ \alpha_{51} \\ \alpha_{52} \\ \alpha_{53} \end{bmatrix}, \ldots, \alpha_8 = \begin{bmatrix} \alpha_{80} \\ \alpha_{81} \\ \alpha_{82} \\ \alpha_{83} \end{bmatrix}$$

$$w = [w_{11}^T, w_{12}^T, w_{21}^T, w_{22}^T, w_3^T, w_4^T]^T$$

$$A = \begin{bmatrix} 0 & 0 & \alpha_{10}H_{12} & 0 & \alpha_{11}H_{13} & \alpha_{12}H_{14} \\ 0 & 0 & 0 & \alpha_{20}H_{12} & \alpha_{21}H_{13} & \alpha_{22}H_{14} \\ \alpha_{30}H_{21} & 0 & 0 & 0 & \alpha_{31}H_{23} & \alpha_{32}H_{24} \\ 0 & \alpha_{40}H_{21} & 0 & 0 & \alpha_{41}H_{23} & \alpha_{42}H_{24} \\ \alpha_{50}H_{31} & 0 & \alpha_{51}H_{32} & \alpha_{52}H_{32} & 0 & \alpha_{53}H_{34} \\ 0 & \alpha_{60}H_{31} & \alpha_{61}H_{32} & \alpha_{62}H_{32} & 0 & \alpha_{63}H_{34} \\ \alpha_{70}H_{41} & 0 & \alpha_{71}H_{42} & \alpha_{72}H_{42} & \alpha_{73}H_{43} & 0 \\ 0 & \alpha_{80}H_{41} & \alpha_{81}H_{42} & \alpha_{82}H_{42} & \alpha_{83}H_{43} & 0 \end{bmatrix}$$

Next, the IA scheme is converted into an optimization issue:

$$J = \sum_{n=1}^{(L-N)K} \alpha_n^H \overline{H}_n^H \overline{H}_n \alpha_n \quad (15)$$
$$= w^H A^H A w$$

In which, the constraint conditions are:

$$w_{ki}^H w_{ki} = P_l, l=1, 2, \ldots, L \; \alpha_n^T b = -1, n=1, 2, \ldots, (L-N)K$$

Herein $b = [1, 0, \ldots, 0]^T$, and $w_{ki}^H w_{ki} = P_l$ indicates that a product of the transposition of a precoding vector corresponding to the ith data flow of the kth UE and the precoding vector is the power $P_l$ of the data flow, wherein k=1, 2, 3 . . . K; i=1, 2, . . . $L_k$, and $P_l$ is the power of the lth data flow in the whole data flow. For example, L=6 and the flow distribution is [2 2 1 1], i.e., the first and second UEs each has two flows, and the third and fourth UEs each has one flow, thus the first data flow of the second UE is the third flow in the whole data flow, and a product of the transposition of a precoding vector corresponding to the first data flow of the second UE and the precoding vector is $P_3$.

When J is small enough (approaching zero), it may be deemed that an optimal solution satisfying Formula (15) is found, which is also the solution for Formula (8).

Assuming that D is an L×LM block matrix:

$$D = \text{diag}\{w_{11}^H w_{12}^H \ldots w_{1,L_1}^H \ldots w_{11}^{K1} w_{K2}^H \ldots w_{K,L_K}^H\} \quad (16)$$

Then, the power limitation may be represented as $$Dw = e \quad (17)$$

In which, $e = [P1, P2, \ldots, PL]^T$. Thus, Formula (15) may be equivalent to a minimization of the following first Lagrange function:

$$L_c(w, \alpha_n) = w^H A^H A w + \mu^T (e - Dw) + \sum_{n=1}^{(L-N)K} \lambda_n (1 + \alpha_n^H b) \quad (18)$$

in which, $\lambda_n$ and $\mu$ are Lagrange factors, and D is deemed as a known matrix, thus the complex differential of w is as follows:

$$\partial L_c / \partial w^* = 2 A^H A w - D^H \mu \quad (19)$$

Assuming Formula (19)=0, then $$w = (A^H A)^{-1} D^H [D(A^H A)^{-1} D^H]^{-1} e \quad (20)$$

Based on Formula (15), Formula (18) may be rearranged as the following second Lagrange function:

$$L_c(w, \alpha_n) = \sum_{n=1}^{(L-N)K} \alpha_n^H \overline{H}_n^H \overline{H}_n \alpha_n + \lambda_n (1 + \alpha_n^H b) + \mu^H (e - Dw) \quad (21)$$

the complex differential of $\alpha_n$ is as follows:

$$\partial L_c / \partial \alpha_n^* = 2 \overline{H}_n^H \overline{H}_n \alpha_n + \lambda_n b \quad (22)$$

Assuming Formula (22) equal to 0, then $$\alpha_n = -\frac{(\overline{H}_n^H \overline{H}_n)^{-1} b}{b^T (\overline{H}_n^H \overline{H}_n)^{-1} b} \quad (23)$$

Formula (23) requires the matrix $(\overline{H}_n^H \overline{H}_n)$ to have a full rank, otherwise $\alpha_n$ may be directly set as the zero space vector of $(\overline{H}_n^H \overline{H}_n)$, e.g., the minimal eigenvalue vector, and normalized so that its first element is −1.

The preset initial value of $\alpha_n$ or the preset initial value w is substituted into Formulas (23) and (20), so as to orderly update $\alpha_n$ and w through the cyclic iterations of Formulas (23) and (20), and acquire an optimal solution when the preset convergence condition is satisfied. The preset convergence condition may be that the difference between Lc values of two continuous iterations is smaller than a preset first threshold, or that the number of iterations reaches a preset second threshold, i.e., a preset number of iterations.

Particularly, in consideration of the limitation of the total transmitting power, the optimization issue may be converted to be $$\sum_{k=1}^{K} \sum_{i=1}^{L_k} w_{ki}^H w_{ki} = P_T \quad (24)$$

$$\alpha_n^T b = -1, n = 1, 2, \ldots, (L-N)K$$

In which, PT represents the total power for transmitting respective data flows at the transmitting end; $w_{ki}^H w_{ki}$ represents a product of the transposition of a precoding vector corresponding to the ith data flow of the kth UE and the precoding vector; and $$\sum_{k=1}^{K} \sum_{i=1}^{L_k} w_{ki}^H w_{ki} = P_T$$

represents that a sum of the products of the transposition of a precoding vector corresponding to each data flow of each receiving end and the precoding vector is the total power of the respective data flows.

It is easily acquired that when $\alpha_n$ is given, the optimal w is:

$$w = \frac{1}{\sqrt{P_T}} u_m \quad (25)$$

In which, $u_m$ is a unit eigenvector corresponding to the minimum eigenvector $A^H A$. Through the cyclic iterations of Formulas (23) and (25), $\alpha_n$ and w may be orderly updated to acquire the optimal solution.

The solution of the precoding matrix through iterations is briefly described as follows. For example, the update of $\alpha_n$ and w is regarded as an iteration cycle. It is clear that in the ith iteration, for any $\alpha^{(i-1)}$ value, $w_n^{(i)}$ value may be acquired through Formula (20). Then $\alpha_n^{(i-1)}$ value and $w^{(i)}$ value are substituted into the Lagrange function (18) while $w_n^{(i)}$ value is substituted into Formula (23) to acquire $\alpha^{(i)}$ value. After that, $\alpha_n^{(i)}$ value and $w^{(i)}$ value are used for the next iteration cycle. Thus, the following is obtained:

$$\ldots \geq L_c(\alpha_n^{(i-1)}, w^{(i-1)}) \geq L_c(\alpha_n^{(i-1)}, w^{(i)}) \geq L_c(\alpha_n^{(i)}, w^{(i)}) \geq L_c(\alpha_n^{(i)}, w^{(i+1)}) \geq L_c(\alpha_n^{(i+1)}, w^{(i+1)}) \geq \ldots$$

This indicates that the algorithm is monotone but not increasing, and tends to be converged to a small value. Thus the above convergence condition can be employed.

The aforementioned IA may be performed in an interference space of either the receiving end or the transmitting end. Specifically, for the kth UE, there are $L-L_k$ interference vectors in total:

$$H_{ik}^H g_{im}, m=1, 2, \ldots, L_i, i=1, 2, \ldots, K, i \neq k$$

when it is required to align the $L-L_k$ interference vectors into an interference space of $M-L_k$ dimensions, $$\{H_{jk}^H g_{jm} : g_{jm} \in \phi'_k\} \subset \text{span}[H_{ik}^H g_{im} : g_{im} \in \phi_k], \quad k=1, 2, \ldots, K$$

Herein, the definitions of $\phi_k$ and $\phi'_k$ are the similar to those of $\pi_k$ and $\pi'_k$, and herein are omitted. Similarly, the following IA equation may be acquired:

$$H_{jk}^H g_{jm'} = \sum_{g_{im} \in \varphi_k} \beta_{nr} H_{ik}^H g_{im}$$

$$g_{jm'} \in \varphi'_k, k = 1, 2, \ldots, K$$

In which, $r=1, 2, \ldots, M-L_k$, $n=(k-1)(L-M)+n'$, $n'=1, 2, \ldots, L-M$, and $\beta_{nr}$ represents a coefficient of the rth interference vector in the nth vector equation. Obviously, $\beta nr$ cannot always be zero in each equation. Similarly, if $L_k=M$, there is no interference space. In that case, N×1 zero vectors may be taken as the elements of $\phi_k$. Thus the IA method is still applicable.

When a set of all the equilibrium vectors of all the UEs is obtained, i.e., $g_k=[g_{k1}\ g_{k2}\ \ldots\ g_{kL_k}]^T$ (k=1, 2, ... ,K), a precoding vector $w_k$ of each of the UEs may be acquired through the following equation:

$$w_k = \left(\sum_{i=1}^{K} H_{ik}^H g_i g_i^H H_{ik} + \varepsilon\sigma^2 I_M\right)^{-1} H_{kk}^H g_k$$

In which, $\epsilon=0$ indicates that a zero-forcing equilibrium method is employed, $\epsilon=1$ indicates that a minimum mean square error equilibrium method is employed, and $\sigma^2$ is the noise power. Of course, $w_k$ may be acquired through $g_k$ in other method, without affecting the implementation of the present invention.

FIG. 3 is a schematic diagram of a digital simulation result of spectrum efficiencies acquired according to the above embodiment of the present invention. In which, M is the number of the transmitting antennas, N is the number of the receiving antennas, K is the number of the UEs, L is the total number of the signal flows, and the digits in the brackets represent the numbers of the signal flows of respective UEs. It can be seen that no BER floor occurs even in case of a high SNR.

Figure 4A:
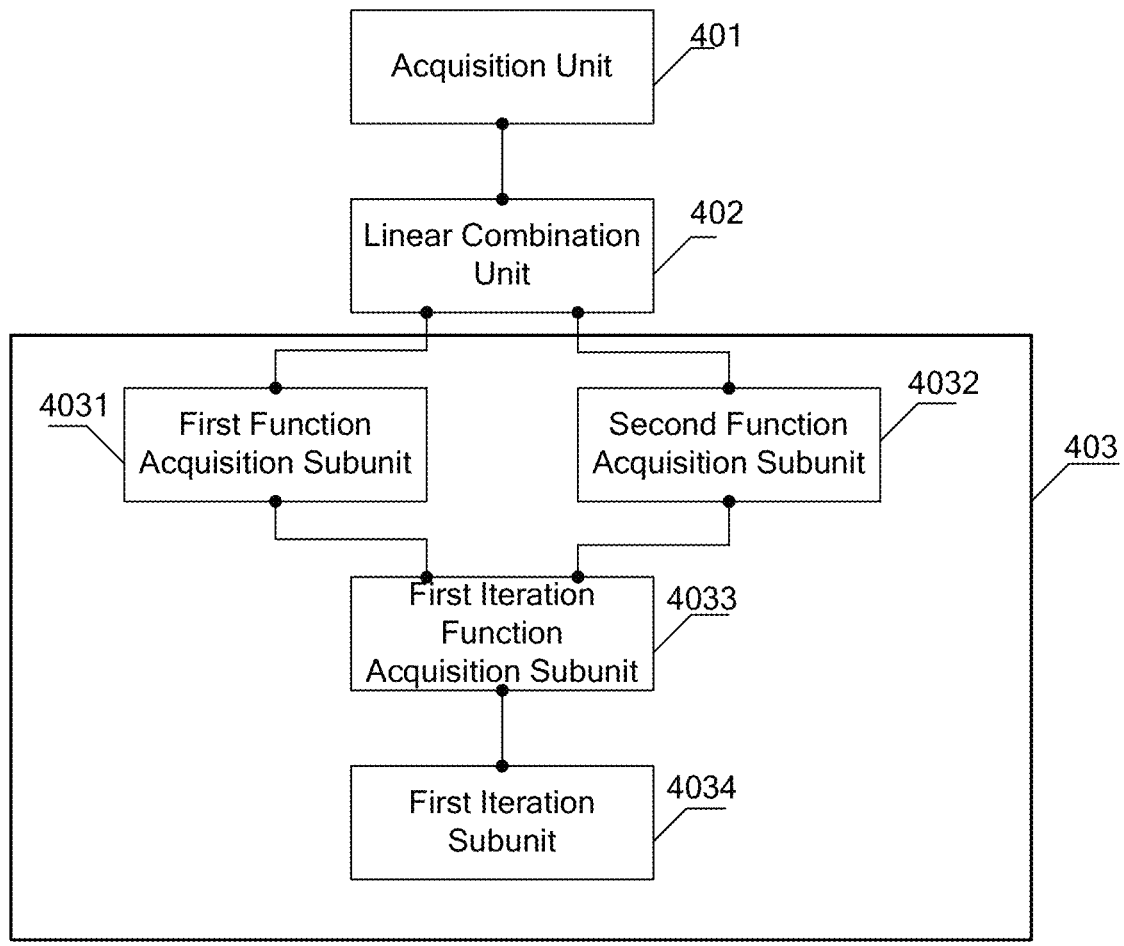
FIGS. 4A and 4B are structure diagrams of a device for acquiring a precoding matrix, respectively.
Figure 4B:
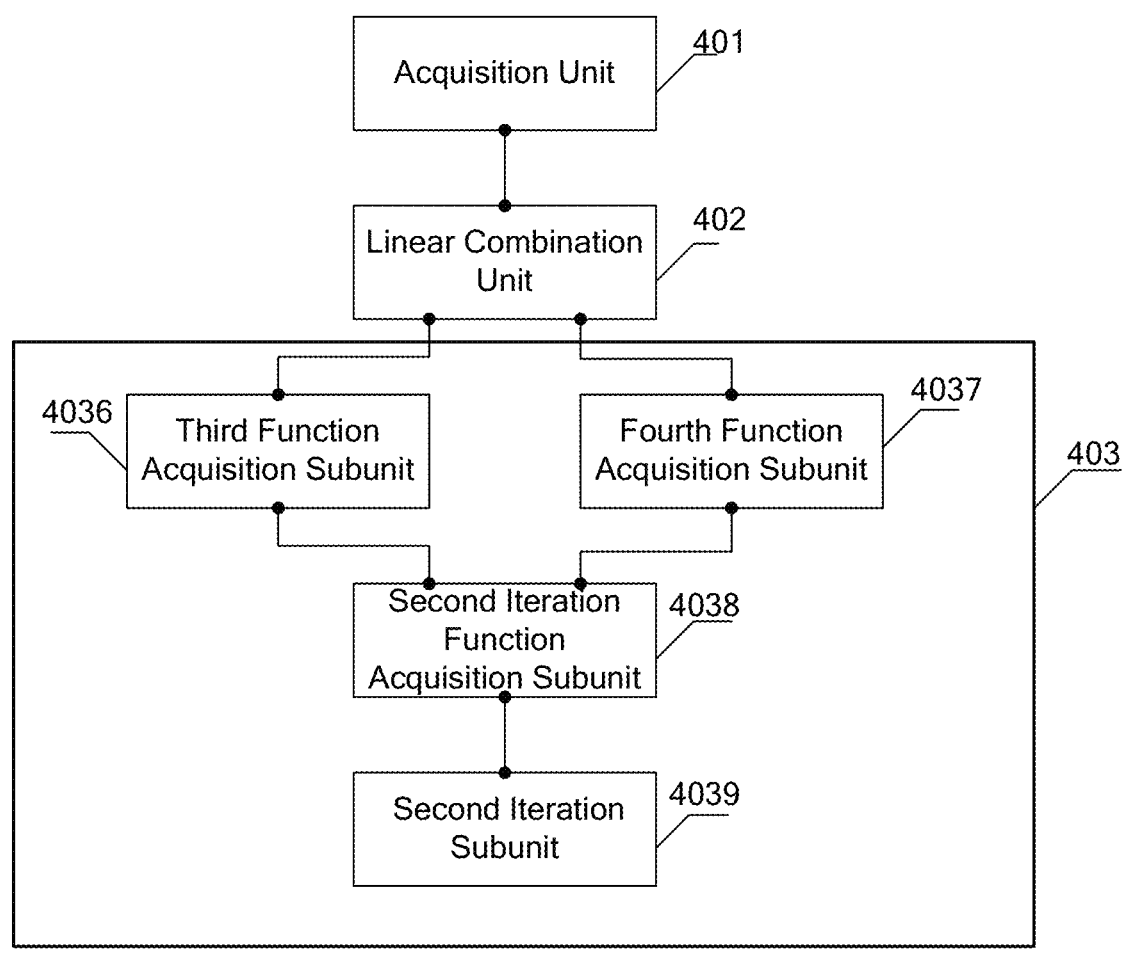

Referring to FIGS. 4A and 4B, the embodiment of the present invention provides a device for acquiring a precoding matrix, which may be a central control apparatus independent from the transmitting and receiving ends, or located at the transmitting end. Specifically, the device includes:

an acquisition unit 401 configured to select, for each receiving end, interference vectors as interference space basis vectors from whole interference vectors;

a linear combination unit 402 configured to represent remaining interference vectors as a linear combination of the interference space basis vectors, wherein the remaining interference vectors are the interference vectors in the whole interference vectors of the receiving end except the interference vectors which act as the interference space basis vectors; and a calculation unit 403 configured to determine a currently used precoding matrix according to the linear combination of the interference space basis vectors represented by the remaining interference vectors of each receiving end and the current channel condition.

In which, the interference vector may be represented as a product of the channel vector and a precoding vector.

In that case, the acquisition unit 401 is configured to determine, for the kth receiving end, that the number of the interference space basis vectors is $N-L_K$, and select $N-L_K$ interference vectors as the interference space basis vectors from $L-L_K$ interference vectors, wherein N is the number of the receiving antennas of the kth receiving end, $L_K$ is the number of the signal flows of the kth receiving end, and L is the total number of the signal flows of a plurality of receiving ends.

The calculation unit 403 includes:

a first function acquisition subunit 4031 configured to acquire a matrix $$\begin{bmatrix} \overline{H}_1 \alpha_1 \\ \overline{H}_2 \alpha_2 \\ \vdots \\ \overline{H}_{(L-N)K} \alpha_{(L-N)K} \end{bmatrix} = 0$$

according to the linear combination of the interference space basis vectors represented by the remaining interference vectors of each receiving end, and acquire a first Lagrange function in an optimization method according to the matrix and the current channel condition; wherein $\alpha_n=[\alpha_{n,0}\ \alpha_{n,1}\ \alpha_{n,2}\ \ldots\ \alpha_{n,(N-L_k)}]$, n=(k-1)(L-N)+n', n'=1, 2, ..., L-N, $\alpha_{n,0}=-1$, $\alpha_{n,1}$, $\alpha_{n,2}$, $\alpha_{n,3}$ and $\alpha_{n(N-Lk)}$ are coefficients of the interference space basis vectors, respectively, when the n'th remaining interference vector of the kth receiving end in the nth vector equation represents the linear combination of the interference space basis vectors; and in $\overline{H}_n$, the first column is a remaining interference vector, while other columns are the interference space basis vectors;

a second function acquisition subunit 4032 configured to acquire that Aw=0 according to the linear combination of the interference space basis vectors represented by the remaining interference vectors of each receiving end, and acquire a second Lagrange function in an optimization method according to the fact that Aw=0 and the current channel condition; l≤L, L is the total number of the data flows, an $A_{nl}$ corresponding to a remaining interference vector in the nth equation is a product of $\alpha_{n,0}$ and a channel matrix in the remaining interference vector, while an $A_{nl}$ corresponding to an interference space basis vector in the nth equation is a product of a channel matrix in the interference space basis vector and a coefficient of the interference space basis vector;

a first iteration function acquisition subunit 4033 configured to acquire a cross-correlation function between vector $a_n$ and precoding matrix w using the first and second Lagrange functions;

a first iteration subunit 4034 configured to substitute a preset initial value of w or a preset initial value of vector $a_n$ into the cross-correlation function to acquire a current value of w or a current value of vector $a_n$, then substitute the current value of w or the current value of vector $a_n$ into the cross-correlation function until a preset condition is satisfied. The preset condition is that the difference between a value acquired by substituting the acquired current value of w or the acquired current value of vector $a_n$ into the first or second Lagrange function this time and a value acquired by the substitution last time reaches a first preset threshold, or that the number of iterations reaches a second threshold.

Or, the interference vector may be represented as a product of a channel vector and an equilibrium vector.

In that case, the acquisition unit 401 is configured to determine, for the kth receiving end, that the number of the interference space basis vectors is $M-L_K$, and select $M-L_K$ interference vectors as the interference space basis vectors from $L-L_K$ interference vectors; wherein, M is the number of transmitting antennas of a transmitting end pairing with the kth receiving end, $L_K$ is the number of the signal flows of the kth receiving end, and L is the total number of the signal flows of a plurality of receiving ends.

The calculation unit 403 includes:

a third function acquisition subunit 4036 configured to acquire a matrix $$\begin{bmatrix} \overline{H}_1 \beta_1 \\ \overline{H}_2 \beta_2 \\ \vdots \\ \overline{H}_{(L-M)K} \beta_{(L-M)K} \end{bmatrix} = 0$$

according to the linear combination of the interference space basis vectors represented by the remaining interference vectors of each receiving end, and acquire a third Lagrange function in an optimization method according to the matrix and the current channel condition; wherein, $\beta_n = \lfloor \beta_{n,0} \ \beta_{n,1} \ \beta_{n,2} \ \ldots \ \beta_{n,(M-L_k)} \rfloor$, $n=(k-1)(L-M)+n'$, $n'=1, 2, \ldots, L-N$, $\beta_{n,0}=-1$, $Q_{n,1}$, $\beta_{n,2}$, $\beta_{n,3}$ and $\beta_{n(M-Lk)}$ are coefficients of the interference space basis vectors, respectively, when the n'th remaining interference vector of the kth receiving end in the nth vector equation represents the linear combination of the interference space basis vectors; and in $\overline{H}_n$, the first column is a remaining interference vector, while other columns are the interference space basis vectors;

a fourth function acquisition subunit 4037 configured to acquire that BG=0 according to the linear combination of the interference space basis vectors represented by the remaining interference vectors of each receiving end; and acquire a fourth Lagrange function in an optimization method according to the fact that BG=0 and the current channel condition; wherein, each submatrix $B_{nl}$ in B is M×N dimensional, $l \leq L$, L is the total number of the data flows; a $B_{nl}$ corresponding to a remaining interference vector in the nth equation is a product of $\beta_{n,0}$ and a channel matrix in the remaining interference vector, while a $B_{nl}$ corresponding to an interference space basis vector in the nth equation is a product of a channel matrix in the interference space basis vector and a coefficient of the interference space basis vector;

a second iteration function acquisition subunit 4038 configured to acquire a cross-correlation function between vector $\beta_n$ and equilibrium matrix G using the third and fourth Lagrange functions;

a second iteration subunit 4039 configured to substitute a preset initial value of equilibrium matrix G or a preset initial value of vector $\beta_n$ into the cross-correlation function to acquire a current value of equilibrium matrix G or a current value of vector $\beta_n$, then substitute the current value of equilibrium matrix G or the current value of vector $\beta_n$ into the cross-correlation function until a preset convergence condition is satisfied. The preset convergence condition is that the difference between a value acquired by substituting the acquired current value of equilibrium matrix G or the acquired current value of vector $\beta_n$ into the third or fourth Lagrange function this time and a value acquired by the substitution last time reaches a third preset threshold, or that the number of iterations reaches a fourth threshold.

In the embodiments of the present invention, for each receiving end, the interference vectors to be aligned are all represented as a linear combination of the interference space basis vectors, thus the interferences can be completely aligned and eliminated, without any BER floor occurring.

To be noted, in the embodiments of the present invention, each pair of transmitting end and corresponding receiving end may have different antenna configurations, without affecting the implementation of the present invention.

A person skilled in the art shall be appreciated that all or a part of steps for implementing the above method embodiments may be completed by instructing relevant hardware through a program that may be stored in a computer readable storage medium, such as ROM, magnetic disk, optical disk, etc.

The method for acquiring a precoding matrix and a device therefor provided by the embodiments of the present invention are detailedly introduced as above, and specific examples are given to illustrate the principle and implementations of the present invention. However, the descriptions of the embodiments are just used to promote the understanding of the method and the core idea of the present invention. Meanwhile, a person skilled in the art may change the specific implementations and the application ranges based on the ideas of the present invention. In conclusion, the content of the Specification shall not be construed as a limitation to the present invention.

What is claimed is:

1. A method for acquiring a precoding matrix, the method comprising:

for each receiving end in a Multi-In Multi-Output (MIMO) system, selecting interference vectors as interference space basis vectors from whole interference vectors, and representing remaining interference vectors as a linear combination of the interference space basis vectors, wherein the remaining interference vectors are the interference vectors in the whole interference vectors of the receiving end except the interference vectors which act as the interference space basis vectors; and determining a currently used precoding matrix according to the linear combination of the interference space basis vectors represented by the remaining interference vectors of each receiving end and a current channel condition, wherein the interference vectors are represented as a product of a channel vector and a precoding vector;

wherein, for each receiving end, selecting the interference vectors as the interference space basis vectors from the whole interference vectors comprises:

for the kth receiving end, determining that the number of the interference space basis vectors is $N-L_K$; and selecting $N-L_K$ interference vectors as the interference space basis vectors from $L-L_K$ interference vectors;

wherein, N is the number of receiving antennas of the kth receiving end, $L_K$ is the number of signal flows of the kth receiving end, and L is the total number of signal flows of a plurality of receiving ends, and wherein N, $L_K$, and L are integers.

2. The method according to claim 1, wherein, determining the currently used precoding matrix according to the linear combination of the interference space basis vectors represented by the remaining interference vectors of each receiving end and the current channel condition comprises:

acquiring a matrix $$\begin{bmatrix} \overline{H}_1 \alpha_1 \\ \overline{H}_2 \alpha_2 \\ \vdots \\ \overline{H}_{(L-N)K} \alpha_{(L-N)K} \end{bmatrix} = 0$$

according to the linear combination of the interference space basis vectors represented by the remaining interference vectors of each receiving end, and acquiring a first Lagrange function in an optimization method according to the matrix and the current channel condition;

wherein, $\alpha_n = \lfloor \alpha_{n,0} \ \alpha_{n,1} \ \alpha_{n,2} \ \ldots \ \alpha_{n,(N-L_k)} \rfloor$, $n=(k-1)(L-N)+n'$, $n'=1, 2, \ldots, L-N$, $\alpha_{n,0}=-1$, $\alpha_{n,1}$, $\alpha_{n,2}$, $\alpha_{n,3}$ and $\alpha_{n(N-Lk)}$ are coefficients of the interference space basis vectors, respectively, when the n'th remaining interference vector of the kth receiving end in the nth vector equation represents the linear combination of the interference space basis vectors; and in $\overline{H}_n$, the first column is a remaining interference vector, while other columns are the interference space basis vectors;

acquiring that Aw=0 according to the linear combination of the interference space basis vectors represented by the remaining interference vectors of each receiving end;

acquiring a second Lagrange function in an optimization method according to the fact that Aw=0 and the current channel condition; wherein, each submatrix $A_{nl}$ in A is N×M dimensional, l≤L, L is the total number of data flows; an $A_{nl}$ corresponding to a remaining interference vector in the nth equation is a product of $\alpha_{n,0}$ and a channel matrix in the remaining interference vector, while an $A_{nl}$ corresponding to an interference space basis vector in the nth equation is a product of a channel matrix in the interference space basis vector and a coefficient of the interference space basis vector;

acquiring a cross-correlation function between vector $a_n$ and precoding matrix w using the first and second Lagrange functions; and substituting a preset initial value of w or a preset initial value of vector $a_n$ into the cross-correlation function to acquire a current value of w or a current value of vector $a_n$, then substituting the current value of w or the current value of vector $a_n$ into the cross-correlation function until a preset condition is satisfied; the preset condition is that the difference between a value acquired by substituting the acquired current value of w or the acquired current value of vector $a_n$ into the first or second Lagrange function this time and a value acquired by the substitution last time reaches a first preset threshold, or that the number of iterations reaches a second threshold.

3. A method for acquiring a precoding matrix, the method comprising:

for each receiving end in a Multi-In Multi-Output (MIMO) system, selecting interference vectors as interference space basis vectors from whole interference vectors, and representing remaining interference vectors as a linear combination of the interference space basis vectors, wherein the remaining interference vectors are the interference vectors in the whole interference vectors of the receiving end except the interference vectors which act as the interference space basis vectors; and determining a currently used precoding matrix according to the linear combination of the interference space basis vectors represented by the remaining interference vectors of each receiving end and a current channel condition, wherein the interference vectors are represented as a product of a channel vector and an equilibrium vector;

wherein, for each receiving end, selecting the interference vectors as the interference space basis vectors from the whole interference vectors comprises:

for the kth receiving end, determinng that the number of the interference space basis vectors is $M-L_K$; and selecting $M-L_K$ interference vectors as the interference space basis vectors from $L-L_K$ interference vectors;

wherein, M is the number of transmitting antennas of a transmitting end pairing with the kth receiving end, $L_K$ is the number of signal flows of the kth receiving end, and L is the total number of signal flows of a plurality of receiving ends, and wherein M, $L_K$, and L are integers.

4. The method according to claim 3, wherein, determining the currently used precoding matrix according to the linear combination of the interference space basis vectors represented by the remaining interference vectors of each receiving end and the current channel condition comprises:

acquiring a matrix $$\begin{bmatrix} \overline{H}_1 \beta_1 \\ \overline{H}_2 \beta_2 \\ \vdots \\ \overline{H}_{(L-M)K} \beta_{(L-M)K} \end{bmatrix} = 0$$

according to the linear combination of the interference space basis vectors represented by the remaining interference vectors of each receiving end, and acquiring a third Lagrange function in an optimization method according to the matrix and the current channel condition;

wherein, $\beta_n = \lfloor \beta_{n,0} \beta_{n,1} \beta_{n,2} \cdots \beta_{n,(M-L_k)} \rfloor$, n=(k−1)(L−M)+n', n'=1, 2, ..., L−N, $\beta_{n,0}$=−1, $\beta_{n,1}, \beta_{n,2}, \beta_{n,3}$ and $\beta_{n(M-Lk)}$ are coefficients of the interference space basis vectors, respectively, when the n'th remaining interference vector of the kth receiving end in the nth vector equation represents the linear combination of the interference space basis vectors; and in $\overline{H}_n$, the first column is a remaining interference vector, while other columns are the interference space basis vectors;

acquiring that BG=0 according to the linear combination of the interference space basis vectors represented by the remaining interference vectors of each receiving end; and acquiring a fourth Lagrange function in an optimization method according to the fact that BG=0 and the current channel condition; wherein, each submatrix $B_{nl}$ in B is M×N dimensional, l≤L, L is the total number of the data flows; a $B_{nl}$ corresponding to a remaining interference vector in the nth equation is a product of $\beta_{n,0}$ and a channel matrix in the remaining interference vector, while a $B_{nl}$ corresponding to an interference space basis vector in the nth equation is a product of a channel matrix in the interference space basis vector and a coefficient of the interference space basis vector;

acquiring a cross-correlation function between vector $\beta_n$ and equilibrium matrix G using the third and fourth Lagrange functions;

substituting a preset initial value of equilibrium matrix G or a preset initial value of vector $\beta_n$ into the cross-correlation function to acquire a current value of equilibrium matrix G or a current value of vector $\beta_n$, then substituting the current value of equilibrium matrix G or the current value of vector $\beta_n$ into the cross-correlation function until a preset convergence condition is satisfied; the preset convergence condition is that the difference between a value acquired by substituting the acquired current value of equilibrium matrix G or the acquired current value of vector $\beta_n$ into the third or fourth Lagrange function this time and a value acquired by the substitution last time reaches a third preset threshold, or that the number of iterations reaches a fourth threshold.

5. A device for acquiring a precoding matrix, the device comprising:

an acquisition unit configured to select, for each receiving end, interference vectors as interference space basis vectors from whole interference vectors;

a linear combination unit configured to represent remaining interference vectors as a linear combination of the interference space basis vectors, wherein the remaining interference vectors are the interference vectors in the whole interference vectors of the receiving end except the interference vectors which act as the interference space basis vectors; and a calculation unit configured to determine a currently used precoding matrix according to the linear combination of the interference space basis vectors represented by the remaining interference vectors of each receiving end and a current channel condition, wherein the interference vectors are represented as a product of a channel vector and a precoding vector;

wherein the acquisition unit is further configured to determine, for the kth receiving end, that the number of the interference space basis vectors is $N-L_K$, and select $N-L_K$ interference vectors as the interference space basis vectors from $L-L_K$ interference vectors, wherein N is the number of the receiving antennas of the kth receiving end, $L_K$ is the number of signal flows of the kth receiving end, and L is the total number of signal flows of a plurality of receiving ends, and wherein N, $L_K$, and L are integers.

6. The device according to claim 5, wherein, the calculation unit comprises:

a first function acquisition subunit configured to acquire a matrix $$\begin{bmatrix} \overline{H}_1 \alpha_1 \\ \overline{H}_2 \alpha_2 \\ \vdots \\ \overline{H}_{(L-N)K} \alpha_{(L-N)K} \end{bmatrix} = 0$$

according to the linear combination of the interference space basis vectors represented by the remaining interference vectors of each receiving end, and acquire a first Lagrange function in an optimization method according to the matrix and the current channel condition; wherein $\alpha_n = [\alpha_{n,0} \alpha_{n,1} \alpha_{n,2} \ldots \alpha_{n,(N-L_k)}]$, n=(k−1)(L−N)+n', n'=1, 2, . . . , L−N, $\alpha_{n,0}$=−1, $\alpha_{n,1}$, $\alpha_{n,2}$, $\alpha_{n,3}$ and $\alpha_{n(N-LK)}$ are coefficients of the interference space basis vectors, respectively, when the n'th remaining interference vector of the kth receiving end in the nth vector equation represents the linear combination of the interference space basis vectors; and in $\overline{H}_n$, the first column is a remaining interference vector, while other columns are the interference space basis vectors;

a second function acquisition subunit configured to acquire that Aw=0 according to the linear combination of the interference space basis vectors represented by the remaining interference vectors of each receiving end, and acquire a second Lagrange function in an optimization method according to the fact that Aw=0 and the current channel condition; wherein each submatrix $A_{nl}$ in A is N×M dimensional, 1≤L, L is the total number of the data flows; an $A_{nl}$ corresponding to a remaining interference vector in the nth equation is a product of $\alpha_{n,0}$ and a channel matrix in the remaining interference vector, while an $A_{nl}$ corresponding to an interference space basis vector in the nth equation is a product of a channel matrix in the interference space basis vector and a coefficient of the interference space basis vector;

a first iteration function acquisition subunit configured to acquire a cross-correlation function between vector $a_n$ and precoding matrix w using the first and second Lagrange functions; and a first iteration subunit configured to substitute a preset initial value of w or a preset initial value of vector $a_n$ into the cross-correlation function to acquire a current value of w or a current value of vector $a_n$, then substitute the current value of w or the current value of vector $a_n$ into the cross-correlation function until a preset condition is satisfied; the preset condition is that the difference between a value acquired by substituting the acquired current value of w or the acquired current value of vector $a_n$ into the first or second Lagrange function this time and a value acquired by the substitution last time reaches a first preset threshold, or that the number of iterations reaches a second threshold.

7. A device for acquiring a precoding matrix, the device comprising:

an acquisition unit configured to select, for each receiving end, interference vectors as interference space basis vectors from whole interference vectors;

a linear combination unit configured to represent remaining interference vectors as a linear combination of the interference space basis vectors, wherein the remaining interference vectors are the interference vectors in the whole interference vectors of the receiving end except the interference vectors which act as the interference space basis vectors; and a calculation unit configured to determine a currently used precoding matrix according to the linear combination of the interference space basis vectors represented by the remaining interference vectors of each receiving end and a current channel condition, wherein the interference vectors are represented as a product of a channel vector and an equilibrium vector;

wherein the acquisition unit is further configured to determine, for the kth receiving end, that the number of the interference space basis vectors is $M-L_K$, and select $M-L_K$ interference vectors as the interference space basis vectors from $L-L_K$ interference vectors;

wherein, M is the number of transmitting antennas of a transmitting end pairing with the kth receiving end, $L_K$ is the number of signal flows of the kth receiving end, and L is the total number of signal flows of a plurality of receiving ends, and wherein M, $L_K$, and L are integers.

8. The device according to claim 7, wherein, the calculation unit comprises:

a third function acquisition subunit configured to acquire a matrix $$\begin{bmatrix} \overline{H}_1 \beta_1 \\ \overline{H}_2 \beta_2 \\ \vdots \\ \overline{H}_{(L-M)K} \beta_{(L-M)K} \end{bmatrix} = 0$$

according to the linear combination of the interference space basis vectors represented by the remaining interference vectors of each receiving end, and acquire a third Lagrange function in an optimization method according to the matrix and the current channel condition; wherein, $\beta_n = [\beta_{n,0} \beta_{n,1} \beta_{n,2} \ldots \beta_{n,(M-L_k)}]$, n=(k−1)(L−M)+n', n'=1, 2, . . . , L−N, $\beta_{n,0}$=−1, $\beta_{n,1}$, $\beta_{n,2}$, $\beta_{n,3}$ and $\beta_{n(M-Lk)}$ are coefficients of the interference space basis vectors, respectively, when the n'th remaining interference vector of the kth receiving end in the nth vector equation represents the linear combination of the interference space basis vectors; and in $\overline{H}_n$, the first column is a remaining interference vector, while other columns are the interference space basis vectors;

a fourth function acquisition subunit configured to acquire that BG=0 according to the linear combination of the interference space basis vectors represented by the remaining interference vectors of each receiving end; and acquire a fourth Lagrange function in an optimization method according to the fact that BG=0 and the current channel condition; wherein, each submatrix $B_{nl}$ in B is M×N dimensional, 1≤L, L is the total number of the data flows; a $B_{nl}$ corresponding to a remaining interference vector in the nth equation is a product of $\beta_{n,0}$ and a channel matrix in the remaining interference vector, while a $B_{nl}$ corresponding to an interference space basis vector in the nth equation is a product of a channel matrix in the interference space basis vector and a coefficient of the interference space basis vector;

a second iteration function acquisition subunit configured to acquire a cross-correlation function between vector $\beta_n$ and equilibrium matrix G using the third and fourth Lagrange functions; and a second iteration subunit configured to substitute a preset initial value of equilibrium matrix G or a preset initial value of vector $\beta_n$ into the cross-correlation function to acquire a current value of equilibrium matrix G or a current value of vector $\beta_n$, then substitute the current value of equilibrium matrix G or the current value of vector $\beta_n$ into the cross-correlation function until a preset convergence condition is satisfied; the preset convergence condition is that the difference between a value acquired by substituting the acquired current value of equilibrium matrix G or the acquired current value of vector $\beta_n$ into the third or fourth Lagrange function this time and a value acquired by the substitution last time reaches a third preset threshold, or that the number of iterations reaches a fourth threshold.

* * * * *

UNITED STATES PATENT AND TRADEMARK OFFICE
CERTIFICATE OF CORRECTION

| | | |
|---|---|---|
| PATENT NO. | : 8,660,225 B2 | Page 1 of 1 |
| APPLICATION NO. | : 13/873940 | |
| DATED | : February 25, 2014 | |
| INVENTOR(S) | : Liu et al. | |

It is certified that error appears in the above-identified patent and that said Letters Patent is hereby corrected as shown below:

*Title page, item (71) Applicant's City of Residence "Guangdong (CN)" should read*
*-- Shenzhen (CN) --.*

Signed and Sealed this
Twenty-seventh Day of May, 2014

Michelle K. Lee
*Deputy Director of the United States Patent and Trademark Office*